…

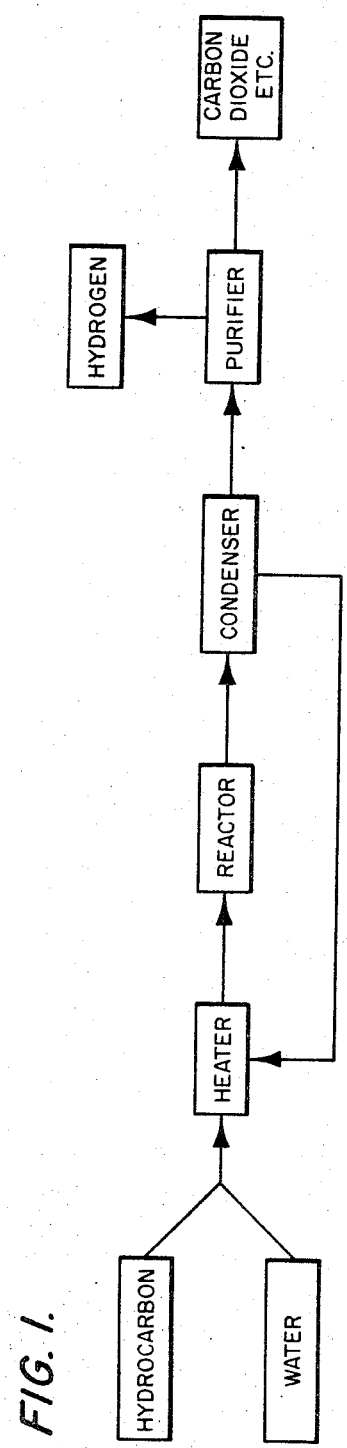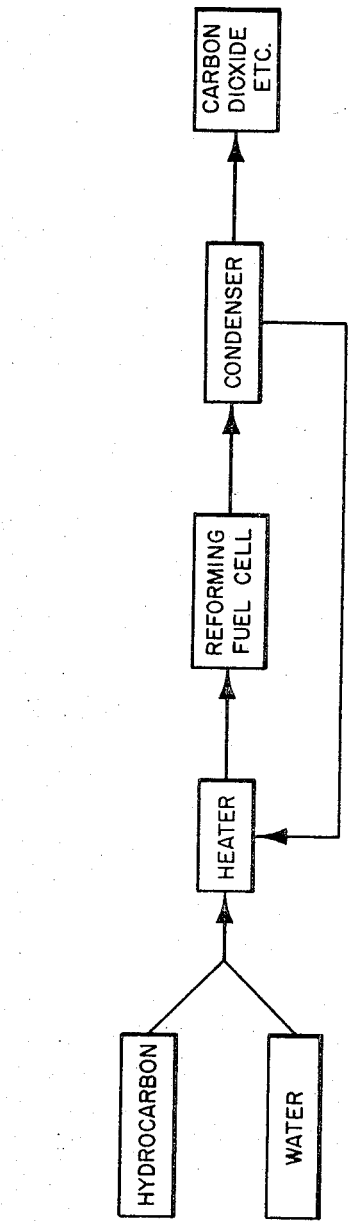

United States Patent Office 3,449,168
Patented June 10, 1969

3,449,168
METHOD FOR CATALYTICALLY REFORMING CARBONACEOUS FEEDSTOCK TO PRODUCE HYDROGEN FOR USE IN FUEL CELLS
Richard A. Sederquist, Newington, Conn., assignor to United Aircraft Corporation, East Hartford, Conn., a corporation of Delaware
Filed Aug. 3, 1965, Ser. No. 476,930
Int. Cl. H01m 27/06, 27/12, 27/30
U.S. Cl. 136—86         9 Claims

ABSTRACT OF THE DISCLOSURE

A hydrogen-containing carbonaceous feedstock is admixed with water vapor and passed as a gaseous stream into contact with a bed of dehydrogenation catalyst at low temperatures and pressures to effect catalytic reforming of only a portion of the feedstock. The conditions of temperature, pressure and space velocity are selected with respect to the catalyst so as to produce an effluent stream of high quality in terms of hydrogen produced from the amount of feedstock reacted. The effluent stream is then passed through a condenser to condense the unreacted feedstock and water from the gaseous reaction products, and the condensed feedstock and water are revaporized and recycled into contact with the catalyst for further reaction.

---

The present invention relates to the conversion of hydrogen-containing carbonaceous feedstocks and, more particularly, to a novel method and apparatus for obtaining hydrogen from hydrogen-containing carbonaceous feedstocks by catalytic dehydrogenation thereof.

Because of a desire to produce electric current from relatively small power plants, there have been considerable efforts in the area of fuel cells wherein the energy generated by an oxidation-reduction chemical reaction at spaced electrodes is directly converted into electrical energy to operate in an external circuit between the the electrodes devices which provide a load. Although some fuel cells have been proposed which utilize relatively impure hydrogen or other oxidizable fuels, generally pure hydrogen has been recognized as the preferred fuel and its corectant has generally been oxygen or the oxygen in air.

Although various techniques have been proposed for converting hydrocarbons and other hydrogen-containing carbonaceous feedstocks into hydrogen for use in such cells, generally the primary emphasis for the generation of hydrogen from hydrocarbons has been placed upon catalytic conversion at relatively high temperatures; i.e. above 700° centigrade. Passage of the resultant gas stream through purifiers employing such means as palladium membranes which are selectively permeable to hydrogen has been employed to minimize the impurities which might contaminate the fuel cell electrolyte which is generally alkaline.

In the copending application of Richard A. Sederquist, Richard F. Buswell and Herbert J. Setzer, entitled Method for Producing Hydrogen from Hydrogen-Containing Feedstocks, Ser. No. 476,891, filed Aug. 3, 1965, there is disclosed a method for obtaining hydrogen at relatively low temperatures wherein only a portion of the fuel, generally about 5 to 55 percent by weight, is reacted under conditions which produce a relatively high quality hydrogen content in the stream of reaction products. Since only a portion of the fuel is reacted, generally less than 55 percent and desirably less than 35 percent, the process of the aforementioned application does not provide maximum utilization of the fuel itself although such lesser utilization may be tolerated for certain systems to obtain the advantages of the aforementioned process.

It is an object of the present invention to provide a novel method operable at low temperatures to obtain a relatively high quality of hydrogen content in the reactor effluent from a low temperature process of catalytic conversion of hydrogen-containing carbonaceous feedstocks wherein the feedstock is substantially completely utilized so as to produce additional economies in operation and to minimize the requirements for fuel.

It is also an object of the present invention to provide such a method wherein the load upon hydrogen separation and purification equipment is substantially reduced and wherein the pressure of hydrogen in the products is increased to facilitate separation thereof.

Another object is to provide such a method which may be utilized in conjunction with a low temperature reforming fuel cell.

Still another object is to provide apparatus for relatively highly efficient utilization of hydrogen-containing carbonaceous feedstocks under low temperature conversion conditions to produce a high quality hydrogen product in the reaction effluent.

Other objects and advantages will be readily apparent from the following detailed specification and claims and the attached drawing wherein:

FIGURE 1 is a diagrammatic representation of a process embodying the present invention; and FIGURE 2 is a diagrammatic representation of an alternative process embodying the present invention.

It has now been found that the foregoing and related objects may be readily attained by a method in which a hydrogen-containing carbonaceous feedstock containing about 5 to 16 carbon atoms is admixed with water vapor and then passed in gaseous form at a temperature of 100 to 590° centigrade into contact with a dehydrogenation catalyst maintained at a temperature of about 125 to 590° centigrade to produce catalytic reforming reaction in a portion of the feedstock. The term "dehydrogenation catalyst" as used herein refers to a steam reforming catalyst of the type which will reform hydrogen-containing carbonaceous feedstocks to products including hydrogen, carbon oxides and methane. The temperature, pressure and space velocity of the reforming reaction are selected with respect to the catalyst to produce reaction of about 5 to 55 percent by weight of the feedstock with the reaction products in the effluent stream providing a value for $\beta$ of not less than about 0.7 in the following equation:

$$\beta(\text{quality of hydrogen produced}) = \frac{\text{total moles hydrogen actually produced}}{\substack{\text{moles hydrogen theoretically obtainable} \\ \text{from the amount of a fuel reacted (with} \\ \text{no methane production)}}}$$

The effluent from the reaction which includes unreacted fuel is then passed to a condenser wherein the unreacted feedstock, or the unreacted feedstock and water combined, are condensed out from the effluent stream and recycled through the catalyst. The gaseous products which are essentially hydrogen, carbon dioxide and small quantities of low molecular weight hydrocarbon such as methane and possibly small amounts of water vapor pass outwardly of the condenser for further treatment.

When the process is being employed to produce a relatively pure hydrogen stream for subsequent passage into a fuel cell, the gaseous stream is passed through a purifier such as the type employing a membrane of a metal selectively permeable to hydrogen so as to remove the hydrogen therefrom and here the process is particularly advantageous since the pressure of hydrogen has been increased by the removal of the condensible portion of the effluent stream. Where the effluent is from a low temperature reforming fuel cell, the gaseous stream may be vented to atmosphere, or purified for recovery of the hydrogen if so desired, or used as a fuel for heating elements of the apparatus.

As can be seen, the condensation of the unreacted feedstocks and the water offers significant advantages since not only is the process rendered more efficient by avoiding waste of the feedstock but also the remaining gaseous products are substantially dry so as to minimize the problems of subsequent purification and hydrogen recovery. Moreover, the gaseous products are not diluted with unreacted water and fuel so that there is permitted the development of hydrogen pressures up to 75 percent of the total reactor pressure, thus greatly facilitating the abstraction of hydrogen through membranes selectively permeable to hydrogen.

In addition, by passing the stream of reactants through the reactor at relatively high speed and relatively low temperature under conditions which negate substantially complete reaction of the feedstock and by thereafter immediately abstracting the hydrogen from the stream, the production of carbon monoxide may be minimized. To maintain the balance of the entire system, sufficient additional feedstock and water must be added to the recycle stream to balance the amount of uncondensed effluent leaving the system through the condenser.

The present invention also allows the operation of a reforming fuel cell under fuel rich conditions wherein a heavy hydrocarbon reforming fuel cell produces higher power with a mixture having a low steam to hydrocarbon molar ratio. By providing a high quality hydrogen content in the reaction products, the reforming cell may utilize the most efficient rich fuel to water ratio while providing the highest possible hydrogen partial pressure in the cell. Recycling of the condensed fuel (and water) is supplemented by make-up feedstock and water to maintain the balance of the system.

As will be readily appreciated, various means may be used for condensing the unreacted fuel and water. For example, a water, or other gas or liquid, cooled heat exchanger may be employed, or the stream may be passed through a packed tower. To minimize the load on the purification equipment, the condenser should remove substantially all the water as well as the unreacted fuel.

As pointed out in the aforementioned application, it is considered that a high-quality hydrogen reaction product stream may be obtained from reactions wherein relatively low amounts of fuel are reacted at relatively low temperatures. By proper selection of the catalyst and the conditions of operation with respect to that catalyst, the reforming process may be conducted so as to cause reaction or breakdown of only a relatively small percentage of the feedstock but under such conditions that the reacted feedstock is substantially completely converted to the end products of hydrogen and carbon dioxide. Although the theory of operation is not completely understood, it is considered that a low temperature quasi-equilibrium state has been found involving predominately the reaction products of hydrogen and carbon dioxide together with the initial reactants of heavy hydrocarbon and water. The general reaction or equation for the aforementioned low temperature quasi-equilibrium state may be described as follows:

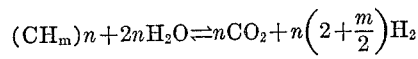

wherein $n$ equals the number of carbon atoms in the fuel and $m$ equals the number of hydrogen atoms per atom of carbon in the fuel.

By the discovery of the above phenomenon, it is possible to obtain a high-quality hydrogen output at relatively low temperatures so as to minimize or avoid the need for high temperatures and successive reform and shift reactors. The high quality of hydrogen concentration in the effluent stream enhanced by the increase in partial pressure provided by the present invention enables a high degree of efficiency in hydrogen abstraction processes.

The above phenomenon in the aforementioned application is in contrast with the conventional equilibrium considerations for reformation of liquid hydrocarbons which predict predominate conversion to methane at low temperatures and, therefore, have dictated the utilization of higher temperatures to reform the methane to the desired hydrogen and carbon oxide products. However, the use of high temperatures results in excessive production of carbon monoxide so that generally the catalytic processes heretofore employed generally provide a low temperature shift converter to convert the carbon monoxide to carbon dioxide and additional hydrogen through its reaction with steam.

As is shown in the aforementioned application, the value for the quality of hydrogen or $\beta$ which represents the total moles of hydrogen actually produced in the effluent stream divided by the moles of hydrogen which might be obtained theoretically from the amount of fuel reacted assuming no production of methane tends to fall off sharply as the amount of fuel reacted increased at lower temperatures.

In making the computations for description of the quasi-equilibrium concept, the fuel has been designated as $(CH_m)n$. The steam required has been based upon a molar ratio based upon moles of carbon since the stoichiometric ration is 2.0 except for an alcohol or other oxygen-containing feedstock. In this manner, mixed fuels such as gasoline and various other hydrocarbon fractions can be accommodated despite the fact that the number of carbon atoms per mole in the fuel is often not known. In the equations for the reformer parameters the value of $n$ cancels out and so it need not be actually established for purposes of the present invention. However, the value of $m$ must be known and is easily calculable from the ratio of hydrogen to carbon for a mixed fuel which may be readily established.

Obviously, three general reactions may occur during the reformation of higher molecular weight hydrocarbon fuels:

(1) The conversion of the fuel:

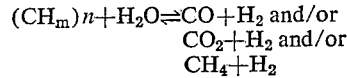

(2) The shifting of the carbon monoxide:

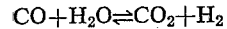

(3) The reforming of methane:

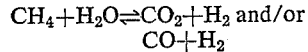

The foregoing reactions have not been balanced since the particular reaction path products would, of course, dictate the molar quantities of the reactance and products.

Obviously, each of the three above reaction parameters has the characteristic that, if none of the reactant is actually reacted, the value of the respective parameter is 0; however, if all of the reactant is reacted, the respective parameter is 1. In the case of the shift and reform parameters, the conversion only applies to that amount of the reactant which could have been formed from the fuel which has been converted. The reform conversion parameter is complicated by the fact that some carbon monoxide or carbon dioxide is generated when the fuel is converted to methane. Thus, some carbon monoxide or carbon dioxide would be present even if no methane is reformed. In practice, very small amounts of intermediate molecular weight hydrocarbons have been observed and they may be accommodated by adding them to the amount of unreacted fuel. The following is a solution for a general hydrocarbonaceous fuel:

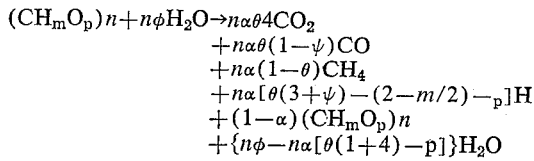

wherein:

$$\theta = \frac{CO + CO_2}{CO + CO_2 + CH_4}$$

$$\psi = \frac{CO_2}{CO + CO_2}$$

$$\theta\psi = \frac{CO_2}{CO + CO_2 + CH_4}$$

As previously defined, the quality of hydrogen produced factor or $\beta$ equals the moles of hydrogen actually produced divided by the moles of hydrogen which could be produced theoretically from the reacted fuel if methane equals 0 for a given value of the fraction of fuel reaction ($\alpha$).

More particularly, the temperatures which may be employed for the catalytic reaction in accordance with the aforementioned application range from about 120 to about 590° centigrade. From the standpoint of obtaining a relatively high degree of reaction commensurate with the utilization of the low-temperature phenomenon, the preferred temperature range for the method is about 200 to 485° centigrade.

The pressures employed may vary between atmospheric and 200 pounds per square inch absolute. From the standpoint of minimization of equipment fabrication problems and high quality of hydrogen production, the preferred pressures are atmospheric to 40 pounds per square inch absolute. The space velocities may vary between 500 and 5000 hours$^{-1}$ depending upon the activity of the catalyst and temperatures and pressures employed.

Various hydrocarbonaceous fuels may be employed in the present process including paraffins, olefins, aromatics and alcohols containing from 5 to about 16 carbon atoms. The preferred fuels are saturated hydrocarbons containing 6 to 10 carbon atoms, and combinations thereof, either alone or with relatively small amounts of unsaturated hydrocarbons. Conveniently, hexane, heptane, octane, nonane, decane, and mixtures thereof, may be employed.

Because of the equilibrium factors in this process, a relatively low steam to carbon molar ratio may be employed; i.e., approaching the stoichiometric ratio of 2.0:1.0. Generally, the ratios employed are about 2.0 to 6.0:1.0. The catalysts may comprise any of the conventional dehydrogenation catalysts such as nickel, cobalt and platinum.

Although the present invention may utilize fuel reaction of about 5 to about 55 percent by weight of the feedstock, preferably the amount of fuel reacted falls within the range of about 10 to 35 percent by weight in order to obtain the high quality hydrogen production while at the same time obtaining a reasonable degree of fuel reaction. Similarly, although the quality of hydrogen produced or $\beta$ may be as low as 0.7, it preferably is above 0.8 in order to obtain maximum value from the present invention.

Referring to the attached drawing, FIGURE 1 diagrammatically illustrates a process embodying the present invention wherein a hydrocarbon and water are admixed and heated to form a gaseous stream which is then passed into the catalytic reactor to produce reaction of a portion thereof. The stream from the reactor is then passed through a condenser wherein the hydrocarbon and water are condensed out and recycled to the heater while the uncondensed gases are passed through a hydrogen separator which extracts the hydrogen with the remaining gaseous products being vented therefrom.

In FIGURE 2, the process diagrammatically shown is generally similar except that a reforming fuel cell having the catalyst internally of the anode has been substituted for the reactor. In this process a major portion of the hydrogen is directly abstracted from the fuel cell anode (or reactor) with the remainder of the hydrogen, unreacted water and hydrocarbon, and carbon dioxide (plus some methane) being passed to the condenser. Again the unreacted hydrocarbon and water are recycled, and the gaseous products may be treated to recover the hydrogen, vented or burned to provide heat for the system.

Illustrative of the efficacy of the present invention is the following specific example:

EXAMPLE

A fuel designated "JP-150," a Udex Raffinate manufactured by Texaco, has a hydrogen to carbon ratio of 0.180 and contains 1.8 percent olefins and 0.8 percent aromatics according to A.S.T.M. Test D. 1319. Its viscosity at 100° Fahrenheit is 0.73 and its specific gravity (A.P.I.) is 63.8. A distillation analysis on the Fahrenheit scale is as follows:

Initial Boiling Point _____ 240°
10 percent _____ 267°
20 percent _____ 270°
50 percent _____ 284°
90 percent _____ 306°
End Point _____ 335°

A reactor bed comprising a proprietary nickel catalyst designated as "G-52" by Girdler Catalyst Company was maintained at an average temperature of approximately 525° Fahrenheit. A mixture of 0.046 pound per hour of the above-mentioned fuel and 0.146 pound per hour steam was passed through the catalyst bed at a pressure of 15.446 pounds per square inch absolute.

The effluent from the reactor was passed through a packed bed in which the unreacted hydrocarbon and water was condensed, revaporized and passed through the catalyst again. An analysis of the condensate indicated that it comprised 0.00668 pound per hour of feedstock and 0.0462 pound per hour of water. At a volume of 900 cubic centimeters per minute of gas was recorded after the condensation, the gas stream was analyzed as containing 72.5 percent hydrogen, 22.2 percent carbon dioxide, 4.8 percent methane, and 0.5 percent carbon monoxide. Continuing operation indicated consumption of about 30 percent of the hydrocarbon at about 900 cubic centimeters per minute of gas from the condenser and a high quality of hydrogen in the gaseous products at various outputs.

Thus, it can be seen that the present invention provides a novel method and apparatus for low-temperature catalytic conversion of hydrogen-containing carbonaceous feedstocks wherein the feedstock is substantially completely utilized while at the same time providing a high quality hydrogen content in the stream from the condenser. The separation of the unreacted fuel and water reduces the load upon subsequent purification equipment and increases the hydrogen pressures so as to facilitate abstraction. The method also permits utilization of rich feedstock: water ratios in reforming fuel cells since the unreacted feedstock may be recycled to avoid excessively low utilization thereof.

Having thus described the invention, I claim:

1. In the method of converting hydrogen-containing carbonaceous feedstocks to hydrogen, the steps comprising: admixing a hydrogen-containing carbonaceous feedstock having a carbon chain from 5 to 16 carbon atoms and mixtures of feedstocks of such carbon chain lengths with water vapor in a steam-to-carbon molar ratio of about 2.0–6.0:1.0; passing a gaseous stream of said admixture at a temperature of about 100 to 485° centigrade into contact with a dehydrogenation catalyst at a temperature of about 200–485° centigrade and at a pressure of about atmospheric to 200 p.s.i.a. to produce a reforming reaction, the conditions of temperature, pressure and space velocity being selected with respect to said catalyst to produce catalytic reforming of only about 5 to 55 percent by weight of said feedstock to yield an effluent stream containing unreacted feedstock, hydrogen and carbon dioxide, with the reaction products in the effluent stream providing a value for $\beta$ of not less than about 0.7 in the equation:

$\beta$(quality of hydrogen produced) =
$$\frac{\text{total moles hydrogen actually produced}}{\substack{\text{moles hydrogen theoretically obtainable} \\ \text{from the amount of feedstock reacted} \\ \text{(with no methane production)}}}$$

passing said effluent stream through a condenser to condense the unreacted feedstock and water from the gaseous products; and revaporizing said condensed feedstock and water and passing the revaporized feedstock and water into contact with said catalyst at the aforementioned conditions.

2. The method in accordance with claim 1 wherein said hydrogen-containing carbonaceous feedstock consists predominately of a saturated hydrocarbon.

3. The method in accordance with claim 1 wherein said feedstock contains 6 to 10 carbon atoms.

4. The method in accordance with claim 1 wherein said catalyst is provided within an anode of a reforming fuel cell.

5. The method in accordance with claim 1 wherein the space velocity employed is about 500–5000 hours$^{-1}$.

6. The method in accordance with claim 1 wherein about 10 to 35 percent of said feedstock is reacted and the value of $\beta$ is not less than about 0.8.

7. In the method of converting hydrogen-containing carbonaceous feedstocks to hydrogen, the steps comprising: admixing a hydrogen-containing carbonaceous feedstock having a carbon chain from 5 to 16 carbon atoms and mixtures of feedstocks of such chain lengths with water vapor in a steam-to-carbon molar ratio of about 2.0–6.0:1.0; passing a gaseous stream of said admixture at a temperature of about 100 to 485° centigrade into contact with a dehydrogenation catalyst at a temperature of about 200 to 485° centigrade and a pressure of about atmospheric to 200 p.s.i.a. to produce a reforming reaction, the conditions of temperature, pressure and space velocity being selected with respect to said catalyst to produce catalytic reforming in only about 5 to 55 percent of said feedstock to yield an effluent stream containing unreacted feedstock, hydrogen and carbon dioxide with the reaction products in the effluent stream providing a value for $\beta$ of not less than about 0.7 in the equation:

$\beta$(quality of hydrogen produced) =
$$\frac{\text{total moles hydrogen actually produced}}{\substack{\text{moles hydrogen theoretically obtainable} \\ \text{from the amount of feedstock reacted} \\ \text{(with no methane production)}}}$$

passing said effluent stream through a condenser to condense the unreacted feedstock and water from the gaseous products; revaporizing said condensed feedstock and water and passing the revaporized feedstock and water into contact with said catalyst at the aforementioned conditions; and passing said gaseous products into contact with a membrane selectively permeable to hydrogen to extract the hydrogen therefrom, said steps being conducted at substantially equal pressures.

8. In the method of reforming hydrogen-containing carbonaceous feedstocks, the steps comprising: admixing a hydrogen-containing carbonaceous feedstock having a carbon chain from 6 to 10 carbon atoms and mixtures of feedstocks of such chain lengths with water vapor in a steam-to-carbon molar ratio of about 2.0–4.0:1.0; passing a gaseous stream of said admixture at a temperature of about 100 to 485° centigrade into contact with a dehydrogenation catalyst at a temperature of about 200 to 485° centigrade and at a pressure of about atmospheric to 400 p.s.i.a. and a space velocity of about 500–5000 hours$^{-1}$ to produce a catalytic reforming reaction in a portion of said feedstock, the conditions of temperature, pressure and space velocity of said reforming reaction being selected with respect to said catalyst to produce reaction of about 10 to 35 percent by weight of the feedstock with the reaction products in the effluent stream providing a value for $\beta$ of not less than about 0.8 in the equation:

$\beta$(quality of hydrogen produced) =
$$\frac{\text{total moles hydrogen actually produced}}{\substack{\text{moles hydrogen theoretically obtainable} \\ \text{from the amount of feedstock reacted} \\ \text{(with no methane production)}}}$$

passing said effluent stream through a condenser to condense the unreacted feedstock and water from the gaseous products; and revaporizing said condensed feedstock and water and passing the revaporized feedstock and water into contact with said catalyst at the aforementioned conditions.

9. The method in accordance with claim 8 wherein said hydrogen-containing carbonaceous feedstock consists predominately of a saturated hydrocarbon.

References Cited

UNITED STATES PATENTS

| 3,027,237 | 3/1962  | McMullan      | 23—212 X |
|-----------|---------|---------------|----------|
| 3,106,457 | 10/1963 | Lockerbie et al. | 23—212 |
| 3,150,657 | 9/1964  | Shultz et al. | 136—86 X |
| 3,177,097 | 4/1965  | Beals         | 136—86 |
| 3,222,132 | 12/1965 | Dowden        | 23—212 |
| 3,259,523 | 7/1966  | Faris et al.  | 136—86 |
| 3,266,938 | 8/1966  | Parker et al. | 136—86 |
| 3,271,325 | 9/1966  | Davies et al. | 252—466 |
| 3,278,268 | 10/1966 | Pfefferle     | 136—86 |
| 3,297,483 | 1/1967  | McEvoy        | 136—86 |
| 3,337,369 | 8/1967  | Frazier       | 136—86 |

ALLEN B. CURTIS, *Primary Examiner.*

U.S. Cl. X.R.

23—212